United States Patent [19]
Wilby et al.

[11] Patent Number: 5,941,955
[45] Date of Patent: Aug. 24, 1999

[54] RECOVERY OF DISTRIBUTED HIERARCHICAL DATA ACCESS ROUTING SYSTEM UPON DETECTED FAILURE OF COMMUNICATION BETWEEN NODES

[75] Inventors: Mark Wilby; Maria Paula Quintela, both of London, United Kingdom

[73] Assignee: British Telecommunications public limited company, London, United Kingdom

[21] Appl. No.: 08/776,791

[22] PCT Filed: Aug. 9, 1995

[86] PCT No.: PCT/GB95/01882

§ 371 Date: Mar. 24, 1997

§ 102(e) Date: Mar. 24, 1997

[87] PCT Pub. No.: WO96/05704

PCT Pub. Date: Feb. 22, 1996

[30] Foreign Application Priority Data

Aug. 12, 1994 [EP] European Pat. Off. ............. 94305967

[51] Int. Cl.$^6$ ............................. G06F 15/16; G06F 11/00
[52] U.S. Cl. ................................ 709/242; 714/4
[58] Field of Search ............................. 395/181, 182.01, 395/182.02, 200.68, 200.69, 200.72, 200.73; 370/254, 255, 256, 210, 211; 714/2, 3, 22; 709/238–239, 242–243; 707/10, 104, 202

[56] References Cited

U.S. PATENT DOCUMENTS

| | | | |
|---|---|---|---|
| 4,914,571 | 4/1990 | Baratz et al. | 707/10 |
| 5,230,047 | 7/1993 | Frey, Jr. et al. | 364/264 |
| 5,251,248 | 10/1993 | Tokunaga et al. | 455/461 |
| 5,377,262 | 12/1994 | Bales et al. | 379/220 |
| 5,400,338 | 3/1995 | Flammer, III | 370/94.1 |
| 5,442,683 | 8/1995 | Hoogeveen | 455/403 |
| 5,579,385 | 11/1996 | Wille et al. | 379/221 |
| 5,594,722 | 1/1997 | Iida et al. | 370/426 |
| 5,805,578 | 9/1998 | Stirpe et al. | 370/255 |
| 5,825,865 | 10/1998 | Oberlander et al. | 379/211 |

FOREIGN PATENT DOCUMENTS

| | | |
|---|---|---|
| A0 556 515 | 8/1993 | European Pat. Off. . |
| A0 614 322 | 9/1994 | European Pat. Off. . |
| A39 21 637 | 3/1991 | Germany . |

OTHER PUBLICATIONS

Wang, A Fully Distributed Location Registration Strategy for Universal Personal Communication Systems, IEEE Journal on Selected Areas in Communications, vol. 11, No. 6, pp. 850–860, Aug. 1993.

Bouloutas et al., "Alarm Correlation and Fault Identification in Communication Networks," IEEE Trans. on Communications, vol. 42, No. 2/3/4, pp. 523–533, Feb. 1994.

*Primary Examiner*—Zarni Maung
*Assistant Examiner*—Andrew Caldwell
*Attorney, Agent, or Firm*—Nixon & Vanderhye P.C.

[57] ABSTRACT

Data elements stored in a distributed data structure are accessible by means of a hierarchical routing network in which routes through the network to individual data elements are flagged. The network includes communicating links between nodes extending from a "root node" to a plurality of end nodes. The end nodes contain the data elements. To find a data element, a search message entering the network at an end node passes through the network towards the root node until it encounters a flagged route to the relevant data element. Thereafter it passes along the route to the end node containing the relevant data element. The invention is relevant to personal numbering services in a communications network. In this case, the data elements each comprise hardware addresses for users of the network. If a user moves in relation to the network, their hardware address will change and, in many cases, the relevant end node will also change. However, the flagged route consequently changes and the routing network therefore provides automatic tracing of the user. In the case of communication failure between a child and parent node, special system recovery techniques are used to establish a new parent node and to efficiently communicate the hierarchical change to other nodes as needed.

20 Claims, 5 Drawing Sheets

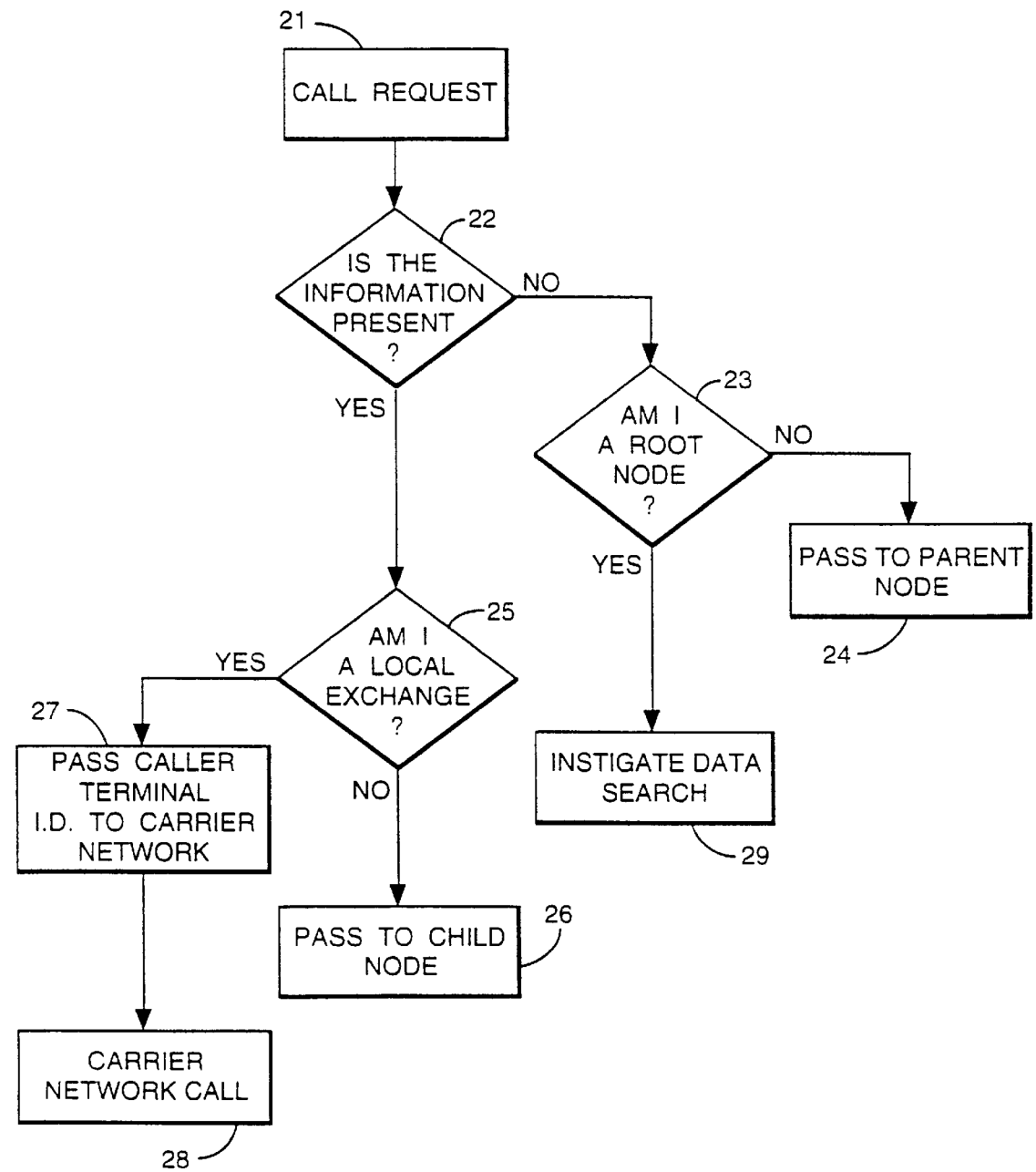

5,941,955

RECOVERY OF DISTRIBUTED HIERARCHICAL DATA ACCESS ROUTING SYSTEM UPON DETECTED FAILURE OF COMMUNICATION BETWEEN NODES

BACKGROUND OF THE INVENTION

1. Field of the Invention

The present invention relates to a configuration method for a data management system, for accessing data in a distributed data structure.

The distributed data structure involved may be provided by many different arrangements. For instance, it might be provided by different nodes in a parallel processing computer. In a communications network on the other hand, it might be provided at different switching points in the network, for instance at local exchanges of a public network. In a particular example, the invention can be used to provide routing information to route calls to users who can change their position with respect to logical or geographic locations in the network.

2. Related Art

Services available by means of communication networks are becoming increasingly complex. It has become important to introduce management systems for the associated service features, which may be selectively available to a customer, whilst not introducing excessive computing or communications overheads. An example is known as personalised telephone numbering schemes. In these, each user, or group of users, might be allocated a telephone number which remains unchanged when the user or users change their location in the network.

For a service such as personal numbering, it is clearly important that location data can be readily changed. From the point of view of the network, the location data is volatile but must always be quickly accessible in its current version.

Another aspect of a network service such as personal numbering is that it is likely to be important that it is scalable. That is, it needs to be capable of being expanded to a much larger, perhaps indefinite, number of users. For instance, it is likely to be important that a network system can grow to support a matter of millions of users. It is also likely that these users will generate variable load. For instance, users arriving at the office may wish to transfer their personal number from their home location to their office location. This would generate several million transactions in the space of a few hours. If a fixed network were to support a fully mobile service, equivalent to that of a cellular radio network, then the overhead carried by the fixed network in updating location information could lead to many millions of transactions every hour.

It is an option to maintain a central database, holding the data relevant to a service such as personal numbering. Any traffic which needs to be routed to a destination in the network may then access the database to obtain a current location for the destination. However, a system of this type generates a significant overhead in that the network must carry traffic simply accessing the central database, either to update location data or to download a current version. An arrangement based on central control is clearly vulnerable to overload.

Another approach, used in cellular (mobile) telephone networks, is to provide each user with a home register, known as a "Home Location Register". Each home register holds data relevant to the user, of the type sometimes known in intelligent network technology as a user profile. That is, it might for instance indicate which services that user subscribes to and give details such as time of day information in relation to services of the "call divert" type which can apply differently at different times of day. It will also contain location data for the user. The home registers together effectively provide a distributed data structure and are allocated so that there is mapping between users' usual locations and the position of their home registers in the network. However, because all calls automatically go to the called user's home register, there is still a significant overhead in dealing with the user when away from his/her usual location. Additionally, changes in the user's location mean the location data in the home register has to be updated, which adds to the signalling load. Further, there are problems as the size of the customer base grows. The design response in a cellular network to an increasing customer base is to decrease the local cell sizes. However, not only does the signalling load grow dramatically, according to a square law, but so does the complexity of the management procedures. Providing data integrity and robustness become significant issues.

A slightly more sophisticated version of the "Home Location Register" (HLR) arrangement has been proposed, in which an additional register is provided, this being known as the "Visited Location Register". It repeats the character of the HLR but is located elsewhere in the network, to deal with call requests when the called user is away from his/her usual location. Incoming calls will be referred to either Register in these circumstances, depending on where the incoming call arises in the network. If a call request is routed to the HLR however, it is simply passed on to the Visited Location Register.

SUMMARY OF THE INVENTION

According to the present invention, there is provided a configuration method for a data access system for accessing data elements stored in a distributed data structure, wherein the system comprises a hierarchy of nodes having communication links there between, the hierarchy extending from a root node to a plurality of end nodes, said plurality of end nodes providing the distributed data structure, and wherein routes through the hierarchy to specific data elements stored at the end nodes are identifiable by pointers stored in nodes along each route, and further wherein a request to access a specific data element triggers a search message which passes through the hierarchy from an end node towards the root node until it reaches a node having a pointer relevant to the specific data element, whereafter the search message is passed along the associated route to the end node containing the data element which recovery method comprising the steps of:

(a) detecting a failure of part of the hierarchy affecting communication between at least one respective child node and respective parent node of the hierarchy.

(b) establishing a first further communication link between the child node and a further node, the further node then becoming a second respective parent node to the respective child node;

(c) establishing a second further communication link between the second parent node and the first parent node;

(d) instructing the first parent node to send messages destined for the child node to the second parent node from which node they are passed to the child node; and (e) the second parent node periodically updating the other nodes of the hierarchy as to the new location if the child node is the hierarchy.

By establishing a second further communication link and then periodically updating the hierarchy as to the new location in the hierarchy of the child node, the signalling required to update the hierarchy can be spread timewise or confined to periods when the "load" on the hierarchy is light. The further communication link caters for requests to the child node from nodes that have not been updated with the child's new location.

Personal numbering has already been mentioned above. It is expected to be a key ingredient in future communications services. Such a system assigns a number or address to an individual user (or potentially to a group of users). Traffic intended for that user or users will then route to the person or persons wherever they are located in the network. Although there is necessarily a current hardware address associated with the user or users, so that the call can be routed to a destination, the hardware address is simply a translation of the personal number allocated, and will change if the relevant user moves location in the network.

In an embodiment of the present invention, the hardware address is represented by the data element which an end node might contain. In a personal numbering system, a user might want to redirect their incoming calls to come to a hardware address in the network which is served by a different local exchange. The user will then up date the end node at the new local exchange so that the relevant hardware address is associated with the user's personal number. That end node should preferably then update the associated pointers in the nodes of the hierarchy to flag a route to the new local exchange for calls to that user's personal number, and instruct the previous end node at which the user was located to cancel its hardware address for that user's personal number. This means that the location data for the user has both moved and changed. A data access system according to an embodiment of the present invention can however track the user's moves, the tracking being triggered at the local exchange, and provide the up-to-date version of the hardware address.

A data access system according to an embodiment of the present invention may be capable of automatically reconfiguring itself, and/or reconstructing its information "space" either on demand or in response to failure. For instance, where embodiments of the present invention have a hierarchical nature a "flood-fill" search procedure can rapidly extend throughout the entire data access system so that missing data can potentially be picked up and reconstructed, in a reconfigured system if necessary.

Embodiments of the present invention can provide a relatively simple solution to the problem of routing, for a service such as personal numbering where routing has to change at a detailed level in the network, in real-time, even in a fixed public switched telephone network (PSTN). In a PSTN, development and changes could otherwise pose very significant routing difficulties for personal numbering.

BRIEF DESCRIPTION OF THE DRAWINGS

A network management system for personal numbering will now be described as an embodiment of the present invention, by way of example only, with reference to the accompanying Figures in which:

FIG. 2 shows in flow chart form a simple information retrieval procedure executed by nodes in the implementation of FIG. 1;

DETAILED DESCRIPTION OF EXEMPLARY EMBODIMENTS

In a personal numbering system in a communications network, service features required by the user are:
1. the ability to programme local terminal equipment, such as a phone, to be the destination apparatus for their personalised telephone number,
2. the ability to revert to a predetermined location in the network, such as a home telephone, as the destination apparatus, and
3. the ability to select at will in the network the destination apparatus for their personalised telephone number.

This means that the network and associated management systems have to be able to cope with routing incoming calls to a "moving target". The basis of the design of network management systems according to embodiments of the present invention is a logical separation of the information management task from that of network infrastructure, implemented in a signalling network that can handle the control of a distributed database whilst being simply expandable. Once the system, comprising the signalling network with the distributed database, has located information, usually in personal numbering this being a hardware destination address, it effectively hands control back to the network infrastructure, or bearer network.

An advantage of this division between bearer and management network is that it facilitates the incorporation of end user control systems and networks, such as mobile communications, internal business, computer networks and the like. Generally, because the management network is a separate conceptual structure, it can be treated physically as a separate structure and can be built directly on an existing system. Therefore it can augment the functionality of existing systems rather than replacing them. Further, it can span several disparate networks, unifying them.

Figure 1:
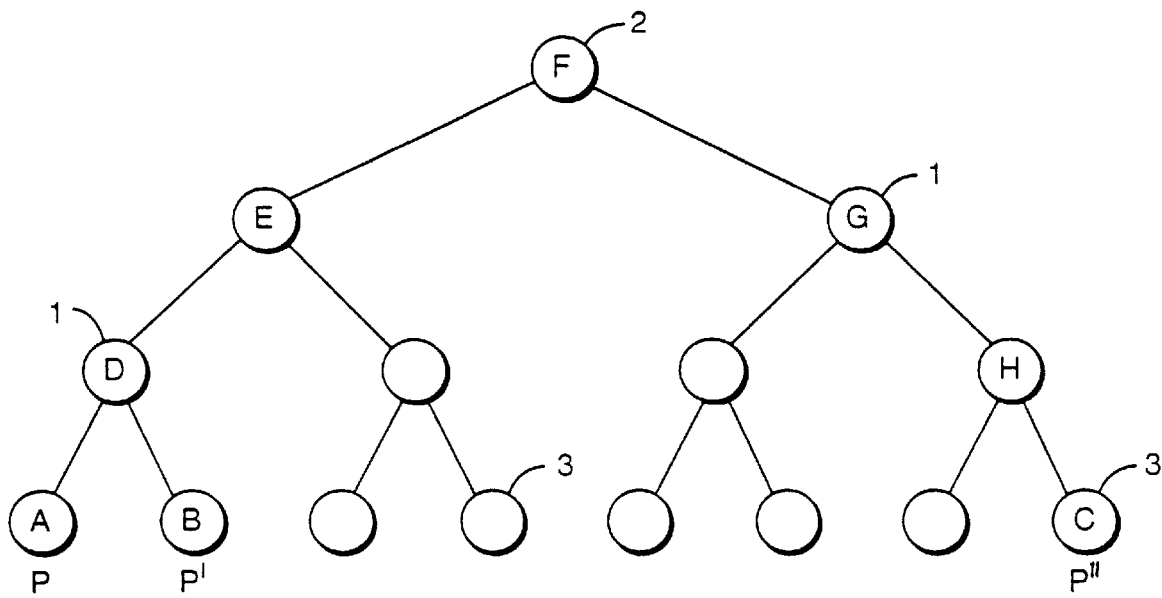
FIG. 1 shows a simple 4-level binary tree implementation of the network management system.

Referring to FIG. 1, the simple basis from which the network management system operates is the nodes 1, 2, 3. The nodes 1, 2, 3 are connected hierarchically, forming a tree-like signalling network. (It should be borne in mind that the tree-like network is a logical structure which can be implemented within a real physical network, but the physical network need not necessarily be tree-like.) All nodes 1, 2, 3 have at least one parent, except for the single node 2 that forms the "root" of the tree. The root node 2 is special only in the sense that it has no parents. This structure, consisting of nodes 1 with only one parent, has advantages in simplicity, multiple parents requiring more sophisticated control logic to deal with the extra decisions to be made. Multiple parented structures however offer more robustness in the face of physical and logical failures, and embodiments of the invention are not limited to use with single parent structures.

In general, nodes 1, 2, 3 will have more than one child except the end nodes 3, which deal directly with the bearer network, these usually being located at local exchanges. These end nodes 3 do not need to have any children and, for simplicity of the following descriptions are assumed to be childless.

Referring to FIG. 1, the general principle of the routing network, comprising the nodes 1, 2, 3 and links, is that each end node 3 can potentially contain (or can provide) a current hardware address for one or more users. If an incoming call request is received to set up a call to a destination user by means of the network, the routing network is used to find out the relevant current hardware address for the destination user. It can do that because although the current hardware address for the destination user might be locatable via any one of the end nodes 3, the correct end node 3 will be flagged in the routing network by means of a trail of pointers to it at the nodes 1, 2 above it in the hierarchy. It doesn't matter at which end node 3 a call request enters the network, the request will simply be passed up through the hierarchy until it meets the trail of pointers which it then follows to the correct end node 3. That is, it will be passed up through the network until it encounters a node 1, 2, containing a pointer in the direction of the correct end node 3. That pointer will direct it to the next node in the trail, and so on back down through the hierarchy to the end node 3 which can provide the destination user's current hardware address.

All the nodes 1, 2, 3 can have the same data structure and processing facility. Data will be present in the data structure only if that particular node has a role to play in directing a call request to a destination user. That role might be i) simply to pass a call request on to its parent node, ii) to offer a pointer to the destination, if the node is not at the destination but lies in the path to the destination, and to pass the call request to the node indicated by the pointer, or iii) to provide the current hardware address of the destination user, if the node concerned is the end node 3 for the destination user.

The information which might be present in the data structure of a node is the pointer, comprising a "key" and a link identifier, and in the case of the end nodes 3 a current hardware address. (Further information which will be present, except in a root node, is a list of parent nodes for use on failure. This is further discussed below. Alternatively, instead of a list the node could search for a new parent.) Although only the end nodes 3 will ever contain a current hardware address, all nodes will generally be capable of containing one. This is because, as will be seen later in this description, if the routing network is expanded or contracted, end nodes 3 may become intermediate nodes 2 and vice versa. The "key" will generally identify the user relevant to the pointer. For instance, the key might be the personal number of that user. The link identifier identifies which of the downward links to the next layer of the routing network a call request should be passed on to.

It might be noted that a routing network as described above clearly provides no "Home Location Register" for any user and therefore avoids any additional signalling load involved in call requests going to, or via, a home register.

Using the signalling network shown in FIG. 1, a user, such as "P", will normally be served by an end node 3, such as the nearest local exchange. This means that the user P's current network hardware address is stored at that local exchange. The user P can then instigate a change in deciding to move from being served by one node, A, to being served by a different node, B. User P instigates the change by accessing node B, which modifies its data to indicate that user P can be found directly from node B without additional routing. Node B then passes a change command to its parent node D, and D consequently changes its data so that instead of routing calls destined to user P to node A it routes them to node B. Node D, acting as parent to node A, informs node A that it no longer routes to user P and should therefore pass any calls for user P to the parent node D.

It can be considered that, at this stage, user P has in effect become user P'. The data structure on the network is substantially unchanged, only nodes A and B, together with parent node D, having been affected.

There is an instance when only node B is capable of finding user P. This is at the stage that node B modifies its data to accommodate user P, but the parent node D has not made the consequential changes. However, this instance is very short lived.

The changes if user P moves to a far more distant node, for instance node C in FIG. 1, are necessarily more far-reaching. Initially node C will change its database to accommodate user P, and instruct its parent, node H in FIG. 1, that the change has taken place. The change will propagate up the tree, node C instructing node H, node H instructing node G, and node G instructing node F, the root of the tree. Node F then "wipes out" the previously existing route to user P by informing its child node E that it no longer routes calls for user P to one of its children. In turn, node E will tell its child node D, and node D will tell its child node A.

Although these changes are more substantial, in the worse possible case 20 the number of changes involved will only be as great as $2 \log_2 (N)$, where N is the total number of nodes in the tree. Importantly, the changes are local, being triggered by communications between adjacent nodes. This makes updating of the distributed routing table very efficient, as well as only requiring existing technology.

Referring to FIG. 2, if a call request is made to establish a connection to a destination user in a bearer network, the routing network is triggered in order to locate the destination user. The routing process will be the same at every node which receives the call request, in that the node will make one or more of a series of decisions and act on the outcome of those decisions.

The routing process at any single node receiving a call request can be seen in flow chart of FIG. 2. The initial response of a node is to examine its data structure for information concerning the destination user, STEP 22. The three possible scenarios will then be as follows:

1. The node concerned is neither at the destination user nor located in a path thereto In this case, at STEP 22, the node will find there is no information present. So that the call request is passed on to the root of the network, the node will then check whether it itself is a root node, STEP 23. The normal situation would then be that the node is not a root node and the call request is simply passed to the parent node, STEP 24. Consequently, the call request will make its way upwards through the network of nodes towards the root node 2.

2. The node concerned is in the path to the node at the destination user, but is not itself the local exchange for the destination user.

In this case, the node will find at STEP 22 that it does hold information about the destination user. It will therefore proceed to make a check as to whether it is itself the node at the destination user. That is, it checks whether it is a local exchange, STEP 25. In this scenario, the answer will be negative and the node will pass the call request to a child node indicated by the information present, STEP 26. Thus the call request at this stage has been passed to the network root node and is being forwarded downwards again towards the destination user. (Although it should be noted that it is not always necessary to route a call request via the root node.)

3. The node is the node adjacent to the destination user.

In this case, by means of STEPS 22 and 25, the node will find that it has information about the destination user and it is also a local exchange. It will therefore now download information to the bearer network which will enable a connection to be setup. That is, it will download the location of the caller from where the call request originated, and its own location information. The routing network can now be drop out of the operation, the bearer network then routing the call itself appropriately, STEPS 27 and 28.

There is one alternative result, not discussed above. That is where a node establishes that it has no information about the destination user but it is a root node 2 and therefore has nowhere to direct the call request. This result indicates that information is missing and, instead of forwarding the call request, the node 2 will instigate a data search, STEP 29.

Systems as described above, based on a tree network, make use of the concept of parallelism. Each node 1, 2, 3 manages a database which is updated in response to changes initiated by its neighbours. The hierarchical arrangement forces a limitation on the need to change information. Although it is possible for a requested data change to propagate throughout the system, the structure is designed so a change has limited consequences. This level of parallelism is evident from the geographical decomposition, but exactly the same decomposition can be applied within a node 1, 2, 3.

The important feature is that the changes within the distributed data structure are dealt with as locally as possible. The majority of the nodes 1, 2, 3 are not involved when a piece of information is updated, which has the effect of distributing the load in terms of updates throughout the network. The consequence of this is that the signalling information in a network continues to be distributed even as the system gets larger. In the case of a binary network, as described with reference to FIG. 1, the signalling load per node 1, 2, 3 is independent of the number of nodes in the network.

Each node 1, 2, 3 might be provided by a distributed memory parallel computer. Each processor within the computer can be mapped directly on to one of the communications nodes 1, 2, 3 described in the above example. The control system of the computer can then manage the database in the same way that the nodes 1, 2, 3 operate. This means that each "leaf" of the tree, that is the nodes representing the local exchange level, that is the lower most nodes 3, break down the problem in the same manner as nodes higher in the network and therefore use the same control processors.

This is particularly advantageous in that each node can potentially be used to control a network of nodes below, always using the same control process. Hence, to expand the reach of a routing network as described above, it is possible to create a new network based on the same architectural principles, create a new root node and "demote" the root nodes of the original network and the network to sit below the new root node.

Figure 3:
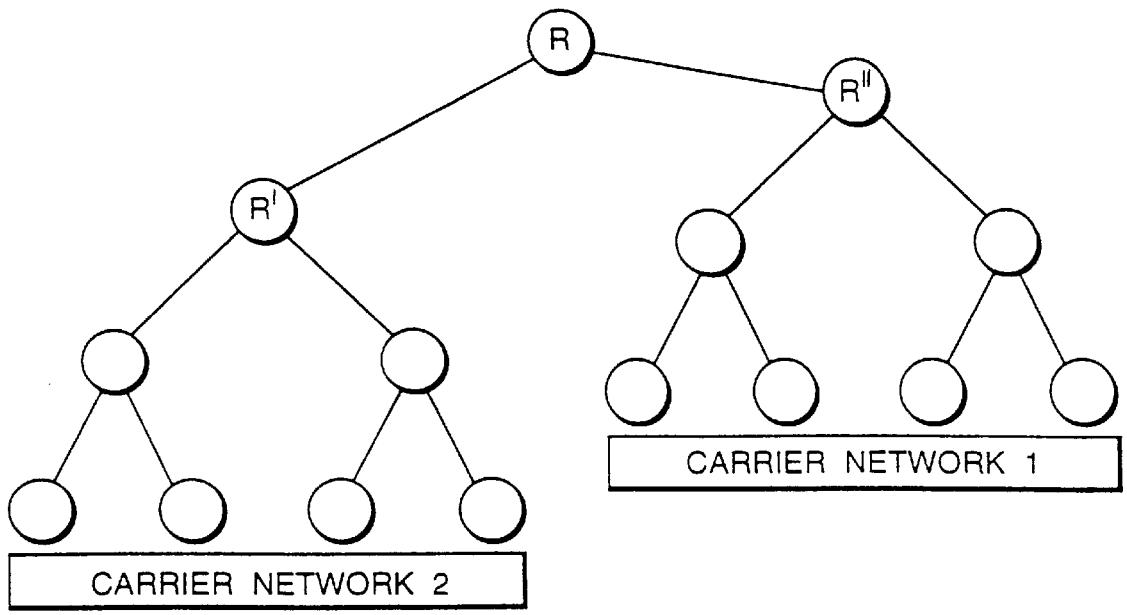
FIG. 3 shows bridging of two network management systems according to the implementation of FIG. 1.

Referring to FIG. 3, the original network may have had a root node "R'" and the new network may have a root node "R''". The new root node "R" is then put in as a new layer, superseding the nodes which were previously root nodes R' and R", the new root R now acting as root to 2 networks.

Figure 4:
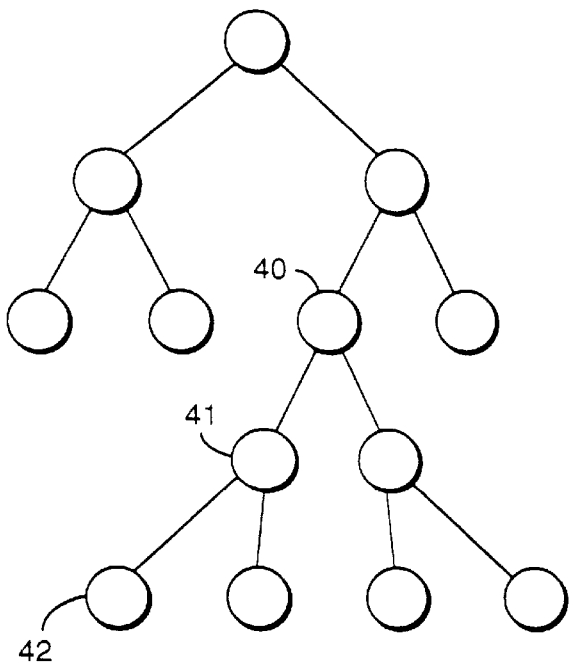
FIG. 4 shows a network management system according to an embodiment of the present invention which has been expanded.

Each of the old root nodes R' and R" needs to be updated to register the fact that they are no longer root nodes. Thereafter, the system will function appropriately. The same principle can be used to expand an existing routing network to fulfil growth and demand which is geographically unevenly distributed. Hence, a node 3 which previously represented a local exchange may be converted to a node 2, higher in the routing network, by simply adding a further network below it. This is shown in FIG. 4, where a node 40, previously in the lower most level of a routing network, has been converted to the role of intermediate node above 6 additional nodes 41, 42, the lower most nodes representing the local exchanges now being two layers below.

In each, as long as each node whose status is changed has been informed, the routing network will effectively sort itself out after a change in configuration.

Figure 5:
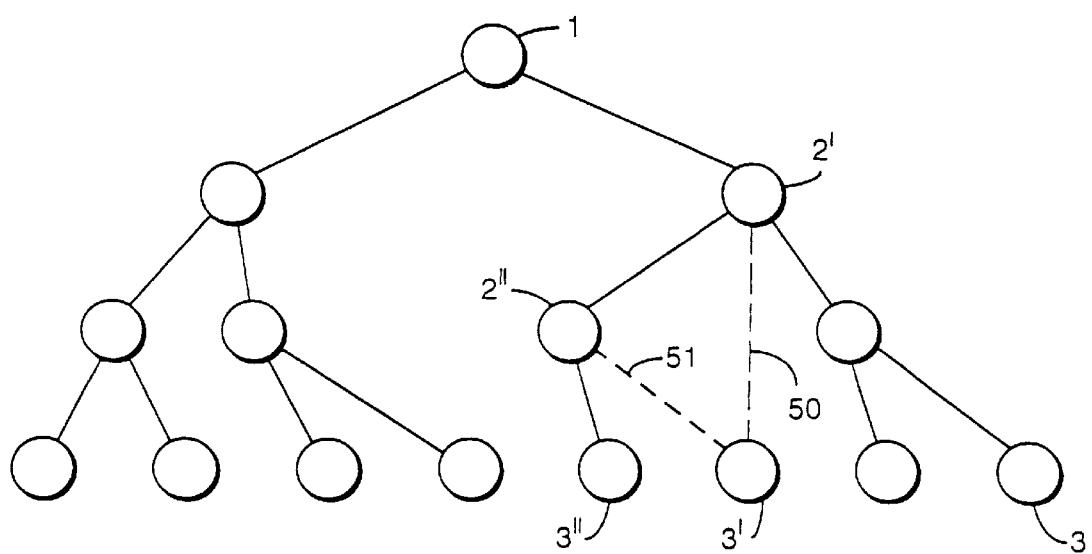
FIG. 5 shows an example of response to a failure within a network management system according to an implementation as shown in FIG. 1.

Referring to FIG. 5, the routing network can be designed to be robust to failure of single links or nodes 1, 2, 3, or to failure of large parts of the network.

The way in which a link failure is detected might be either because a connected node has tried to use the link and failed, or because a network monitoring mechanism has picked up the failure. An example of the latter is the "heart beat" signal provided in conventional C7 signalling systems.

In the simplest situation where there has been a single link failure, for instance between an end node 3' and an intermediate node 2'', then the end node 3' will no longer be able to respond to call requests which it would normally pass on to its parent node 2'' on the other side of the failed link. In the normal routing network structure, there is no alternative link from that end node 3' either to the original parent node 2'' or to any other parent node.

In order to reconfigure the routing network in the face of the link failure, each child node 2, 3 has a list of parent nodes by means of which it can try to establish reconnection in the routing network. The child node 3' affected by the failed link will therefore issue a reconnect request to each potential parent node on its list, in turn, until a functioning parent node with spare capacity is located. Thereafter, reconnection of a route through the network to the child node 3' will be set up in the same manner as reconnection is established when a user moves from one end node 3 to another end node.

In practice, this reconnection exercise can be complex, depending on how high the relevant child node is in the hierarchy, since it will have to issue reconnection requests in respect of all the pointers it contains.

In FIG. 5, a new link 50 will now have been established. However, since the routing network has a logically defined structure in which links are identified for example by addresses at each node, there is no difficulty in creating the new link 50 even though it spans two layers of the hierarchy.

Meanwhile, it may be the case that a call request bound for the end node 3' comes into the routing network elsewhere and therefore needs to be routed either to or via the child node 3' below the failed link. If a child node 3' has already triggered a reconnection exercise, using a new parent, then the network will function in a normal manner. However, a reconnection exercise can generate delay, depending on the number of routes needing to be re-established. If the exercise is not complete then the incoming call request may reach the intermediate node 2'', parent to the end node 3', but be unable to reach the end node 3'. The intermediate node 2'' cannot instigate a new link 51 to reach a child node as effectively as a child node can instigate a new link 50 to reach a new parent. This is because a new child node would only be relevant to a selection of the pointers carried in the intermediate node 2''. In this case it is more effective for the intermediate node 2" to issue a "flood fill" search request in order to locate the child node's new parent 2'.

A flood fill search request is simply issued from a node to every other node to which it is connected. Each node when receiving a flood fill search request will check to see if it contains relevant data, or a relevant pointer. If it does, than that node will respond to the request. If it does not, it will pass on the flood fill search request to every node to which it is connected, except the node from which it was received. (Flood fill search requests can in practice be limited for example by limiting the number of times the request can be passed on.)

Hence the intermediate node 2" should now locate the new parent node 2' for the end node 3' and all relevant routes can be re-established.

The mechanisms described above therefore generate a new link 50 in the network which effectively "by passes" the failure.

The same mechanisms can of course be used whether it is a link or a node which has failed.

There is a second mechanism for re-establishing the network after failure. A flood fill search request for specific information can simply be issued throughout the network. By adopting this approach, extensive reconfiguration of the network can be achieved.

The use of the flood fill search request technique causes a significant signalling overhead and is thus undesirable for less robust networks that is to say those more liable to failure.

Where a node has established a link to a new parent there is a need for the nodes "new" location to be passed to the new parent node. This has to be done as soon as possible if requests are to be passed to the node without delay. The need to update the network causes a burst of signalling activity after a change of address following establishment of a new connection between the node and the new parent. This may cause problems with the network's ability to route requests between the nodes especially where there are a number of re-connections during a given time interval as would be the case with any realistic network.

The present invention arose in an attempt to alleviate this problem.

Figure 7:
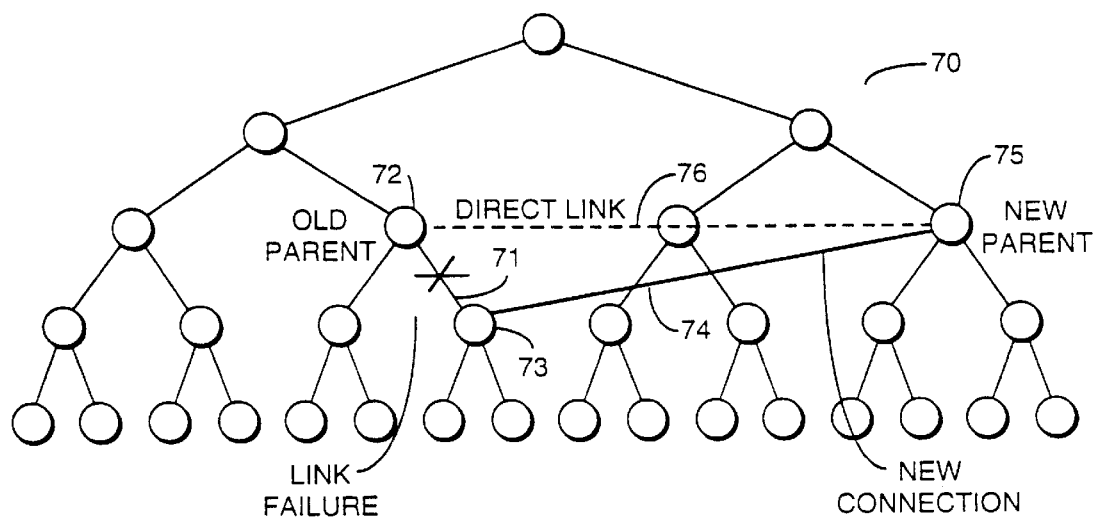
FIG. 7 is an illustrative diagram used in an explanation of a recovery mechanism in accordance with the invention.

FIG. 7 illustrates the recovery method. In the routing network 70 there is a link failure on link 71 between node 72 and 73.

Figure 8:
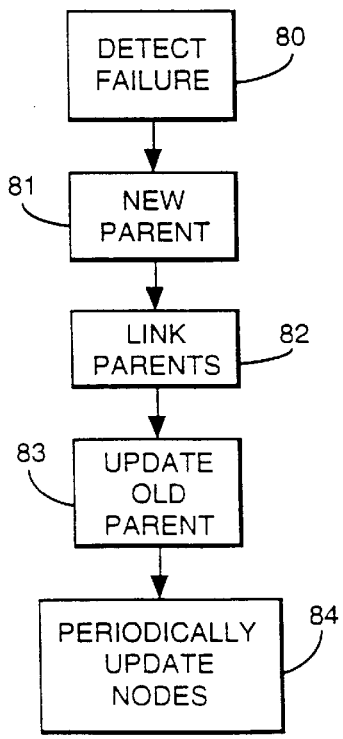
FIG. 8 is a dataflow diagram.

A first step in the recovery mechanism is a detection step 80, as shown in FIG. 8. This step is carried out by the node 73 and it detects that link 71 between it and its parent node 72 has failed. Node 72 carries out this step as well.

A second step 81 is carried out by the node 73 and this is the establishment of a new connection 74 to a new parent 75. The new parent is selected from a list of possible parents held by the node 73.

The new parent node 75 then establishes a direct link 76 to the old parent 72, in a step represented by box 82.

The old parent 72 is then requested by the new parent 75 to update its address for the node 73 and all requests it receives are passed via the direct link 76 to the new parent 75 and new connection 74 to the node 73.

Thus, at this stage the link failure has been overcome and the node 73 is again part of the network 70.

The next stage, as represented by box 84 is for the new parent node 75 to periodically update the other nodes in the network as to the new location of node 73. This process could be carried out "on demand" that is to say when a request is received from a node for node 73 then the new parent 75 could send an update location message to the sending node. This can depend on whether request is relocation for call connection requests. Alternatively, it could be carried out according to a predetermined pattern or carried out according to the activity of the network, that is to say, the updating process could be carried out during a period when there is not much signalling activity on the network.

The network management system, or data access system, described above provides a relatively reliable data structure because the data structure is distributed. The information which is being accessed, in this case hardware addresses for network users, is not held at a single, specific location. Although, at first instance, there is only one route through the system to a data element of that information, failure in the route can be dealt with easily, as described above. An additional feature which might be provided, which would increase security of connections to a user, is a backup data storage point, or a "ghost" end node, holding the current hardware address for a user. This could be located in a flood fill search exercise so that reconnection to that user can still be established.

When a flood fill search request issues, it can generate a relatively high level of signalling traffic. It may be that flood fill search requests are only used in cases of data corruption, or on request, so as to minimise their use. It might be noted that, in a tree-like hierarchy as described above, the path through the routing network to a local exchange, or end node 3, which is in direct contact with a target user, is always less than the $2 \log_2 (N)^{-1}$, making even this search procedure relatively efficient.

In addition to searching, the flood fill requests can remove any reference to the specified data on the nodes they pass through, thereby clearing the network of spurious routes, or data paths. The only exception to this will be at the local exchange, or end node 3, where the information is found. In this case, a location registration process can be initiated so that the data (or route to the data) can be reconstructed. In addition, a call construction request can be passed to the bearer network to ensure that the initial request is dealt with. At worst, this whole process to connect the call takes $4 \log_2 (N)^{-1}$ steps, just twice that taken in the case of an integral network.

Large scale damage can be reconstructed in this way but it is more efficient to use route initiation requests directly to reconstruct. A combination of both processes leads to a fast recovery process, data being built immediately when needed, and data not requested being repaired slowly when the network capacity allows it.

Management systems of the described type are easily expandable. Even in the simplified case presented, that is the tree structure, generalisation to a mechanism for retrieving distributed information is an obvious next step. Even in an environment that is dynamically relocating information and introducing multiple copies, a hierarchical control system provides the fastest access to the closest source of information required. This is true even if an initial node is ignorant of the data to the point that it does not recognise the database key or location address.

This might best be understood in terms of operation of the personalised telephone numbering system described above, from the point of view of the distributed database. The fact that the location of users is constantly monitored and updated makes the internal structure of the management network information that of an automated database. If one adds to that the fact that there is physical distribution of the source of the data, that is the movement of the users, which physically distributes the data, then this minimises the number of transactions each node will have to deal with. The net result is that of a distributed data structure which can be accessed from any one of its remote terminals as if it is a coherent database, whilst the data transactions are being updated in a parallel manner.

By direct analogy, information such as that stored in a library is often located at many geographical locations. To access such information, the location at which it is stored must be known. In a static environment, this is a trivial issue. However, there can be a problem. If there is only one copy of each piece of information, then simultaneous multiple access to a given piece of data is going to present problems. The obvious solution to this is to migrate the data and to produce multiple copies of it. That is, data which is popular can be stored at several geographically separate sites which reduces the access contention and network load. Again, if this is done, once and for all, there is no need to worry about finding the location of any data source from any given location as it will always be in the same place. However, in the real world it is likely that changes will need to be made continually.

It is well known that the popularity of a piece of information is a transient thing. It is directly related to that fact that information is volatile. It is often of value only when it is new, and not when it begins to age. Due to this change in relative value, the location of the data viewed from the perspective of any given terminal can change in time. Informing all users of a system about these changes in location incur a heavy cost in network load. Therefore, a system is needed within which the location of information can be altered without telling the users, the users meanwhile retaining access thereto. This is precisely what the hierarchical control structure of an embodiment of the present invention can do and it is consequently extremely versatile.

The "key" to a database can be thought of literally as a key. It is simply a structure by which information is referenced. Similarly, the references at the end of an article can be viewed as keys. They are not necessarily understood in themselves but can be taken elsewhere to be deciphered, or at least part-deciphered. In the example of an article with references, a librarian could be consulted and the librarian might direct one to the location of the article in the library, or direct one to the correct type of library.

There is an intrinsic hierarchy even at this level of key types. It is possible to superimpose different control hierarchies over a common distributed data source.

Figure 6:
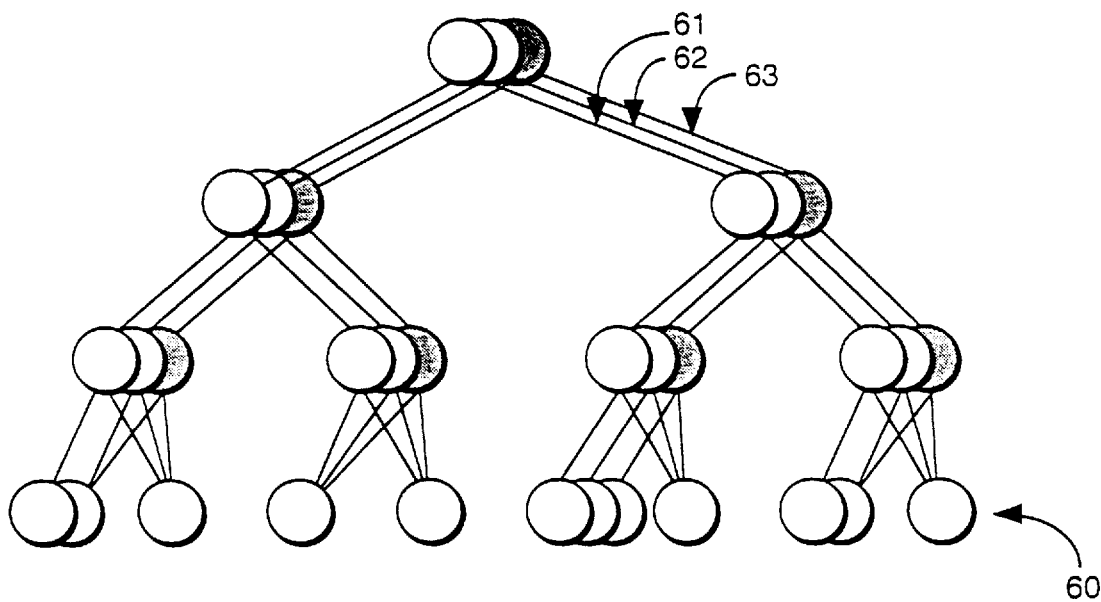
FIG. 6 shows an information layer containing multiple network management systems according to the implementation shown in FIG. 1.

Referring to FIG. 6, at the end node level 60 of three different control hierarchies, there lies a common distributed data source. The three control hierarchies 61, 62, 63 are similar in structure, each having a root node at the "top" and accessing the array of end nodes at the common distributed data source 60. The different control hierarchies can easily be connected to the extent that they can make comparisons and share management information. In FIG. 6, some of the child nodes, in this case end nodes, only contain one type of data store where others contain three, but this does not mean that these "single children" cannot access data from all three types.

There is no reason why this scenario cannot be advanced into that of general database structures. For instance, it is quite possible to use such a system to integrate different databases. Physical distribution presents the same difficulties of data management as that of algorithmic distribution, that is, where algorithmic control of the data is separated into different structures. This would usually be a reference to two different database programmes such as Sybase and Oracle. Such programmes already share a common interface language in that they respond to the same form of data requests from a remote terminal. The data request is first structured into this common language by an application programme and the received data is transformed into the relevant format. Each database programme can be viewed as a physically distinct, or even physically separated, data store. To unify the two systems into a hierarchical control structure as shown in FIG. 6, all that is needed is a simple interface programme that converts requests from the hierarchical control structure into relevant database requests. This allows hierarchical control structures to be applied to existing database systems in a very simple manner.

Hierarchical routing structures according to embodiments of the present invention are capable of offering a general service in that they allow for data retrieval from any part of the hierarchical routing network without necessarily knowing the location of the data source. This functionality can be viewed from the perspective of a user, for instance simply as a service structure which can be accessed at any point. It can be treated as a system to which the user can issue requests from any physical point, and the system will resolve the request for the user.

For a user terminal there will be a direct connection into the hierarchical control network. A user terminal can issue requests into the system and these requests take the form of enquiries about data which is contained in a data space of the routing network. In the specific example of personal numbering, this information is the current hardware address of the user identified by a telephone number dialled. In practice, the routing network does not normally return the current hardware address but instead proceeds to trigger automatic connection of the call from the location of the current hardware address which has been found. This may be applied in other contexts. That is, any application of the routing network may have some predetermined response once a piece of information is found. A response might be to return information to the enquirer but it can be simpler to regard this return of the information as a separate task, actual transport of the information between the two relevant addresses being handled by a conventional transport process, such as a bearer network. The task of the routing network is simply to find the location of the information. A different mechanism can be used to deal with the information once found.

As will be clear, this behaviour is independent of the location of a user terminal. Thus the routing network can be viewed as a database of non local information. More importantly, this database does not have to keep the data at a specific location. If it is found that another site is a more optimum storage place, the information can be moved without affecting any of the user terminals or data access keys which users might be using to retrieve the information.

Figure 9:
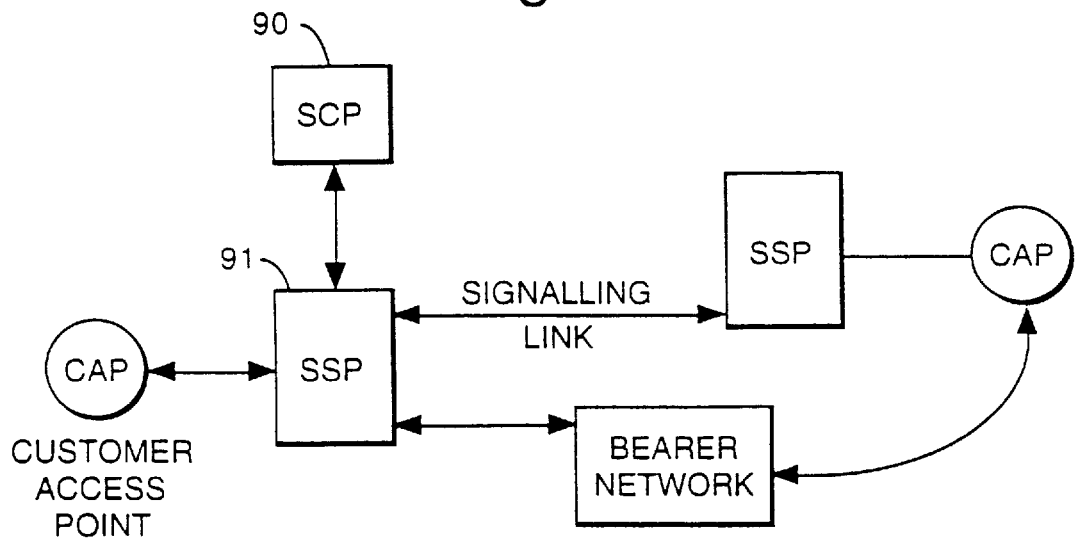
FIG. 9 shows a block diagram of an intelligent network architecture in which the network management system of FIG. 1 can be implemented.

Referring to FIG. 9, and considering the personal numbering application of a routing network according to an embodiment of the present invention, described above, the routing network might typically be provided in the service control point 90 of an intelligent network architecture. In an intelligent network architecture, a connection might normally be established by a service switching point 91, using routing information obtained from an associated service control point 90. Alternatively, intelligent network architectures being highly flexible, the routing network might replace a function of the service control point 90 and be located elsewhere in the intelligent network architecture. Hardware which might provide the functions of the routing network is known and already used in intelligent network architectures. For instance, the relevant hardware might be provided by a Unix work station such as the Sun Sparc 5 having a Gigabyte capacity hard disk.

Important features available to embodiments of the present invention might be listed as follows:

1. Optimisation for the geographical demand, for instance by adding layers to give depth in highly populated regions in a personal numbering service network.
2. In library problems, efficient localisation of the demand can be provided, for instance in services which are literally libraries, or in services such as Video on Demand which is clearly of a library type.
3. Signalling load is kept low and indeed can be maintained so that the signalling load at any point is constant even though the network as a whole has expanded. This aspect is because as demand increases, the network can generate local extra layers.
4. Embodiments of the invention can rely on conventional technology and software already in use and does not therefore require further platform development.
5. Robustness. Although not described above, robustness can be improved by increasing the number of parent nodes for a single child node. That is, there may be more than one parent node relevant to a child node. This is indicated in FIG. 6. Another aspect of robustness is that the routing network will be self-healing.
6. Because new layers can be introduced at the top of a routing network according to an embodiment of the present invention, existing routing networks can be linked by a common root node superimposed so as to convert the original root nodes of the different networks to child nodes. This means that networks can be joined which extend in different national territories.
7. Routing networks of this type allow introduction of new services since no node needs to be updated in respect of a new service, the nodes simply providing routing and having no understanding of the data for which it generates routing information. In conventional networks the nodes include number translation files which would have to be updated when new information was introduced onto the network. This requirement is reduced or eliminated in networks operating in accordance with the invention.

It should be noted that, although the hierarchical structures described above are generally binary tree structures, it is not necessary that they are either binary or tree-like. The structure might be considered for instance as a three-dimensional rather than two-dimensional structure, and/or with multiple links in place of the binary approach. However, a significant aspect is the hierarchy in which nodes of the "upper" layers are fewer and hold more information than nodes of the "lower layers".

The layout of a structure used can be optimised to suit the tasks it will need to perform.

Although the embodiments concerned with a personal numbering service described above are described in relation to a fixed network, they could also be applied to a network which is an integration of a fixed and a mobile cellular network. Indeed, embodiments could be relevant to cellular networks alone.

What is claimed is:

1. A recovery method for a data access system for accessing data elements stored in a distributed data structure, wherein the system comprises a hierarchy of nodes having communication links there between, the hierarchy extending from a root node to a plurality of end nodes, said plurality of end nodes providing the distributed data structure, and wherein routes through the hierarchy to specific data elements stored at the end nodes are identifiable by pointers stored in nodes along each route, and further wherein a request to access a specific data element triggers a search message which passes through the hierarchy from an end node towards the root node until it reaches a node having a pointer relevant to the specific data element, whereafter the search message is passed along the associated route to the end node containing the data element, said recovery method comprising the steps of:

(a) detecting a failure of part of the hierarchy affecting communication between at least one respective child node and respective parent node of the hierarchy;
   (b) establishing a first further communication link between the child node and a further node, the further node then becoming a second respective parent node to the respective child node;
   (c) establishing a second further communication link between the second parent node and the first parent node;
   (d) instructing the first parent node to send messages destined for the child node to the second parent node from which node they are passed to the child node; and
   (e) the second parent node periodically updating the other nodes of the hierarchy as to the new location of the child node in the hierarchy.

2. A method as in claim 1 wherein the data elements each comprise an address which identifies a data storage location in a data structure.

3. A method as in claim 1 wherein the data elements each comprise an address which identifies a location in a communications network.

4. A method as in claim 3 wherein:
   receipt of the search message at the end node containing the data element triggers transmission of the data element to call control means in the communications network such that a connection can be established in the communications network to the location identified.

5. A method as in claim 1 wherein:
   each pointer comprises an identifier associated with a data element stored at the relevant specific end node, together with a link indicator to indicate the next communication link on the route to the end node.

6. A method as in claim 1 wherein:
   receipt of the search message at the end node containing the data element triggers downloading of the data element.

7. A method according to claim 1 further comprising the steps of:
   loading a data element at any end node, and
   responsive to the loading of a data elements, triggering consequential updating of the pointers stored in the nodes of the hierarchy.

8. A recovery method as in claim 1 embodied management method for a data access system in a communications network.

9. A method as in claim 8 used in providing a personal numbering service in the communications network.

10. A method as in claim 9 wherein:
    each pointer along a route identifies a personal number for a specific network user, and
    the data element located at the end node reached by a search message passed along that route comprises a hardware address for the specific network user in said communications network.

11. A recovery apparatus for a data access system accessing data elements stored in a distributed data structure, wherein the system comprises a hierarchy of nodes having communication links therebetween, the hierarchy extending from a root node to a plurality of end nodes, said plurality of end nodes providing the distributed data structure, and wherein routes through the hierarchy to specific data elements stored at the end nodes are identifiable by pointers stored in nodes along each route, and further wherein a request to access a specific data element triggers a search message which passes through the hierarchy from an end node towards the root node until it reaches a node having a pointer relevant to the specific data element, whereafter the search message is passed along the associated route to the end node containing the data element, said recovery apparatus comprising:

(a) means for detecting a failure of part of the hierarchy affecting communication between at least one respective child node and respective parent node of the hierarchy;

(b) means for establishing a first further communication link between the child node and a further node, the further node then becoming a second respective parent node to the respective child node;

(c) means for establishing a second further communication link between the second parent node and the first parent node;

(d) means for instructing the first parent node to send messages destined for the child node to the second parent node from which node they are passed to the child node; and (e) means for causing the second parent node periodically updating the other nodes of the hierarchy as to the new location of the child node in the hierarchy.

12. Apparatus as in claim 11 wherein the data elements each comprise an address which identifies a data storage location in a data structure.

13. Apparatus as in claim 11 wherein the data elements each comprise an address which identifies a location in a communications network.

14. Apparatus as in claim 13 wherein:

receipt of the search message at the end node containing the data element triggers transmission of the data element to call control means in the communications network such that a connection can be established in the communications network to the location identified.

15. Apparatus as in claim 11 wherein:

each pointer comprises an identifier associated with a data element stored at the relevant specific end node, together with a link indicator to indicate the next communication link on the route to the end node.

16. Apparatus as in claim 11 wherein:

receipt of the search message at the end node containing the data element triggers downloading of the data element.

17. Apparatus as in claim 11 wherein means are provided for loading a data element at any end node, and pointer updating means are provided which are responsive to the loading of a data element to trigger consequential updating of the pointers are stored in the nodes of the hierarchy.

18. Apparatus as in claim 11 in combination with a management system for a data access system in a communications network.

19. Apparatus as in claim 18 arranged to provide a personal numbering service in the communications network.

20. Apparatus as in claim 19 wherein:

each pointer along a route identifies a personal number for a specific network user, and the data element located at the end node reached by a search message passed along that route comprises a hardware address for the specific network user in said communications network.

* * * * *